Nov. 17, 1970  F. SCHELL  3,540,307
TUMBLING GEAR PLANETARY TRANSMISSION
Filed July 11, 1968  4 Sheets-Sheet 1

INVENTOR
FRIEDRICH SCHELL

BY Craig & Antonelli
ATTORNEYS

INVENTOR
FRIEDRICH SCHELL

BY *Craig e Antonelli*

ATTORNEYS

United States Patent Office 3,540,307
Patented Nov. 17, 1970

3,540,307
TUMBLING GEAR PLANETARY TRANSMISSION
Friedrich Schell, 23 Metterstrasse, 714 Ludwigsburg-Pflugfelden, Germany
Filed July 11, 1968, Ser. No. 743,994
Claims priority, application Germany, July 11, 1967,
Sch 40,992
Int. Cl. F16h 37/06, 33/00
U.S. Cl. 74—675                                              15 Claims

ABSTRACT OF THE DISCLOSURE

The transmission has two rotatable coaxial input shafts driven by respective motors and an output shaft, wherein one input shaft is provided with a coaxial ring gear and the other input shaft is provided with a meshing ring gear freely rotatable about on an inclined axis; a driving universal type connection is provided between the output shaft and the inclined ring gear, and the meshing gears have a different number of teeth. One of the driving motors is provided with a brake, which acts as an overload friction clutch upon the output shaft being driven from the outside above a predetermined torque.

BACKGROUND OF THE INVENTION

For machine tools, it has been particularly desirable to provide a work carriage or tool carrier carriage with a rapid power traverse or a slow fine power traverse. The rapid traverse is desirable to quickly bring the carriage approximately to the desired station while the slow traverse is desirable for fine adjustment, particularly in a lathe. It is known to provide such a transmission with a planetary gear arrangement and a worm wheel, with a feed motor. However, these gears are quite expensive and therefore the transmission cannot be economically produced. For purposes of economy, hydraulic power advance mechanisms are preferred; however, they suffer from the disadvantages that a constant feeding operation cannot be obtained without the production of considerable heat and without vibrations. Therefore, mechanical drives are preferred with respect to quality.

SUMMARY OF THE INVENTION

The tumbling gear planetary transmission has a motor driven hollow input shaft provided with a coaxial ring bevel gear, a separate coaxial motor driven input shaft provided with a freely rotatable inclined bevel gear meshing with and having a different number of teeth than the first mentioned bevel gear, and an output shaft concentrically mounted within the first mentioned input shaft and provided with a universal joint type driving connection with the inclined gear. With such a construction, the transmission has the above-mentioned advantages of a mechanical drive and is characterized by a simple construction which has an extremely simple operation as compared to the heretofore known gear transmission. Also, the gear transmission of the present invention may be manufactured very economically so that the disadvantages of the known transmissions relating to initial expense are effectively eliminated.

Preferably, the gears are closed within a housing and a motor for driving the hollow input shaft is provided with a friction brake that may operate as an overload friction clutch to prevent injury to the slower fine adjustment mechanism.

To provide considerable latitude in the speed output of the transmission, the motors may be provided as a pole changeable electric motor, or an infinitely variable D.C. motor provided with a resistance control, or by an infinitely variable fluid motor, particularly oil, for example.

The connection between the inclined gear and the shaft output may be a meshing pair of gears, a universal joint or a ball-and-socket joint to provide a force locking drive.

For a particularly compact construction of the transmission, the driving motors may be provided within the housing side by side, or in series, or positioned oppositely with respect to each other. An additional saving in the space requirements and a simplification of the transmission may be obtained by providing only a single motor, with a suitable selective drive means for the two shaft inputs, for example a magnetic clutch and/or drive switching gear.

A particularly economical and space saving power transmission between the respective motors and input shafts may be provided with a chain or gear drive. It is also contemplated that V-belt drives, resilient chains, or the like, may be employed for this purpose.

BRIEF DESCRIPTION OF THE DRAWING

Further objects, features and advantages of the present invention will become more clear from the following detailed description of the drawing wherein.

DETAILED DESCRIPTION OF THE DRAWING

Figure 2:
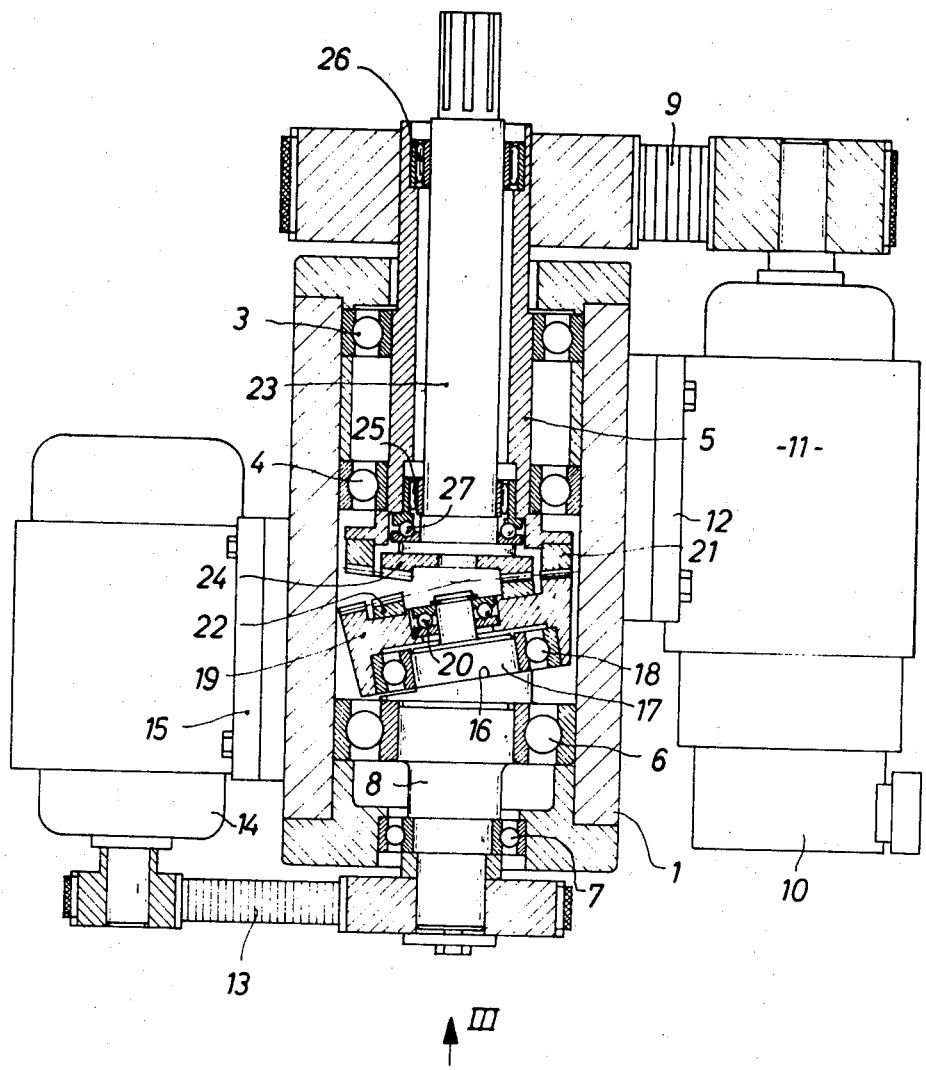
FIG. 2 is an axial partial cross-sectional view taken through the transmission of the present invention employing a pair of gears as the driving connection.
Figure 3:
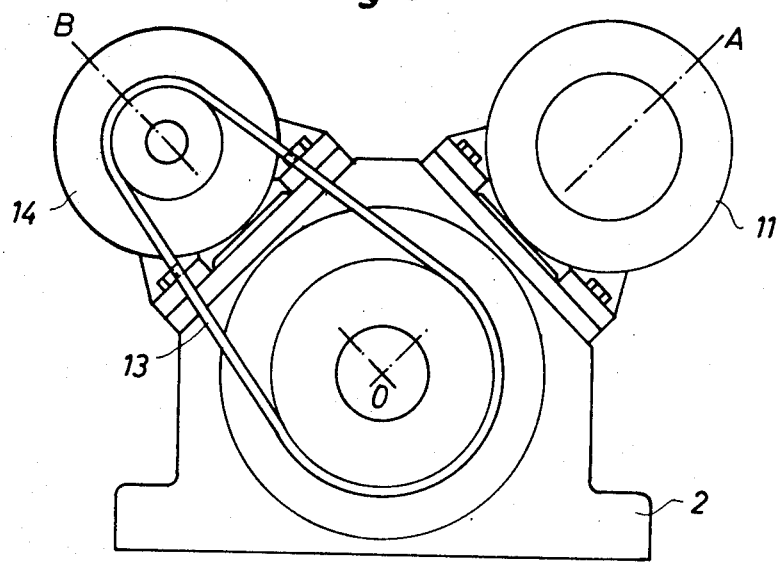
FIG. 3 is an axial end view of the planetary transmission according to FIG. 2, viewed in the direction of arrow 3 in FIG. 2.

As shown in FIGS. 2 and 3, the tumbling gear planetary transmission according to the present invention has a relatively stationary housing 1 fixedly mounted by means of the flanged base 2, which may be bolted to a suitable support. As shown in FIG. 2, axially spaced roller bearings 3 and 4 rotatably mount the tubular input shaft 5. The axially spaced roller bearings 6 and 7 rotatably mount the coaxial input shaft 8 within the housing 1.

The hollow input shaft 5 may be driven by means of a chain, toothed belt or the like 9, drivingly connected with the rapid traverse electric motor 11. The motor 11 is provided with a brake 10 that also serves as an overload friction clutch, which will slip if the transmission is overloaded with the fine or slow traverse gear engaged. The flanged base 12 of the rapid traverse motor 11 is suitably bolted to the outside of the housing 1. Preferably, the motor 11 is infinitely variable in speed and may be reversible with respect to its direction of rotation.

The input shaft 8 may be driven similarly by a chain or toothed rubber belt 13 driving connected with a slow traverse or fine gear motor 14, which is also preferably infinitely variable in speed and reversible with respect to its direction of rotation. Similarly, the slow traverse motor 14 is provided with a flanged base 15 suitably bolted to the side of the housing 1 so that, as seen in FIG. 3, planes OA and OB passing respectively through the motor shafts and the common axis of the input shafts will form a right angle.

The inside end of the input shaft 8 is provided with an annular surface 16 extending obliquely with respect to the axis of rotation of shaft 8, and a similarly inclined collar 17 for supportingly receiving a roller bearing 18 mounting a similarly inclined bevel gear 19. An axial thrust bearing 20 is additionally provided between the shaft 8 and the inclined gear 19 to absorb longitudinal thrusts therebetween. With such an arrangement, the inclined bevel gear 19 is freely rotatably mounted on and at an inclination with respect to the input shaft 8.

The inclined bevel gear 19 is in meshing engagement with the bevel ring gear 21, which gear 21 is rigidly connected to the inside end of the hollow input shaft 5. The gears 19 and 21 have the same pitch but a different number of teeth; preferably a difference of one or two teeth between the gears 19 and 21.

Figure 1:
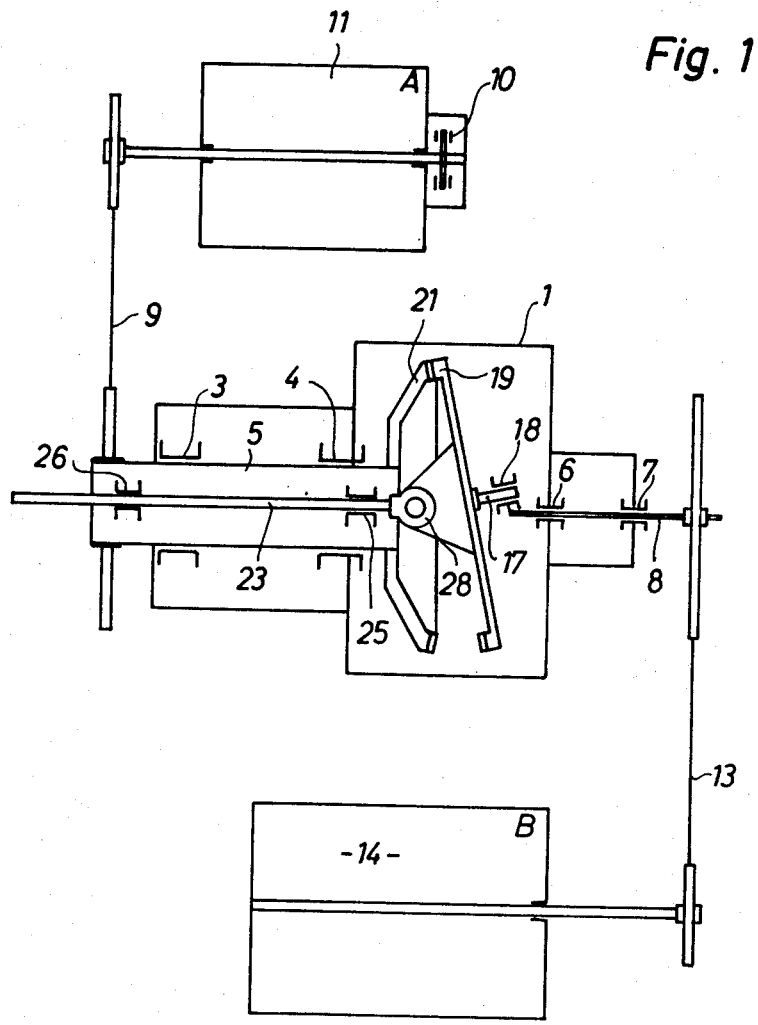
FIG. 1 is a schematic illustration of a tumbling gear planetary transmission according to the present invention with a ball and socket driving connection.

A small bevel gear 22 is rigidly secured, preferably by a threaded connection, to the inside of the inclined bevel gear 19 for meshing engagement with bevel gear 24 that is rigidly mounted on the inside end of the driven output shaft 23 by means of a force-fit. Gears 22 and 24 have the same pitch and the same number of teeth to provide a driving connection between the inclined ring gear and the driven output shaft 23. Also, it is contemplated that the bevel gears 22 and 24 may be replaced by a force driving ball and socket joint or a similarly acting universal joint, as shown in FIG. 1.

Axially spaced roller bearings 25 and 26 are provided between the hollow input shaft 5 and the output shaft 23 to concentrically rotatably mount the output shaft 23. Axial thrust bearings 27 are provided to absorb the longitudinal pressure between the input shaft 5 and the output shaft 23.

Figure 4:
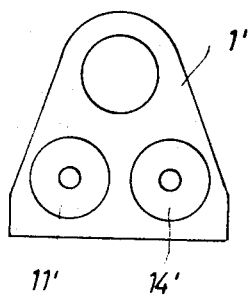
FIG. 4 is a schematic end view, similar to the view of FIG. 3, of a different arrangement of the motors, which are shown side by side.
Figure 5:
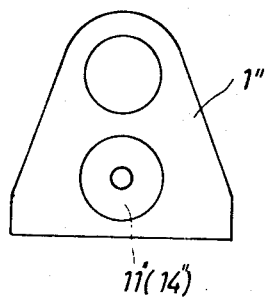
FIG. 5 is a schematic end view of the housing showing the driving motors in series or tandem.
Figure 6:
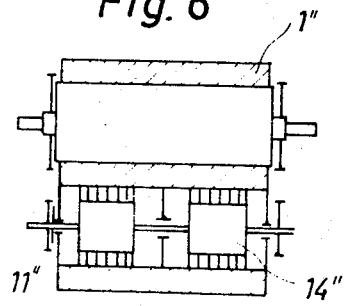
FIG. 6 is a schematic axial cross-sectional view through the transmission according to claim 5 showing the motors coaxially disposed in series or tandem.

The modified spatial arrangement schematically illustrated in FIG. 4 is provided with a housing 1' receiving therein the side by side positioned motors 11' and 14'. FIGS. 5 and 6 illustrate a further modified construction of the housing 1" wherein the motors 11" and 14" may be positioned in series or in tandem. Otherwise, the structure of FIGS. 4–6 is identical to the construction previously described in FIGS. 2 and 3.

Figure 7:
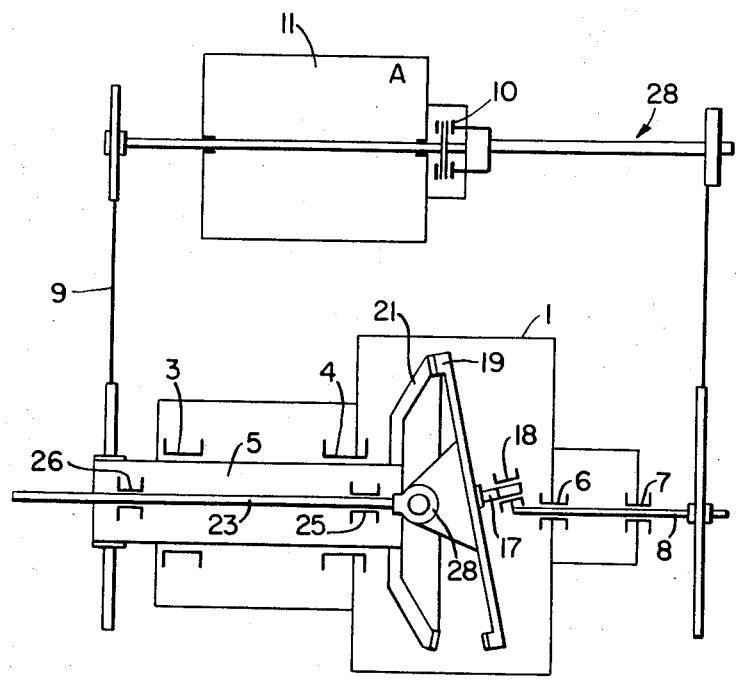
FIG. 7 is a schematic illustration of a tumbling gear planetary transmission according to the present invention wherein a magnetic clutch is drivingly connected between a single motor and the corresponding shaft member.

It is further contemplated that one of the motors, particularly the rapid traverse motor 11 may be omitted and replaced with a magnetic clutch. As shown in FIG. 7 wherein like numerals designate like parts, the magnetic clutch, designated generally by numeral 28, is used with only motor 11 and is located on the same side as drive means 9. The magnetic clutch 28 is drivingly connected with the motor 11 and the input drive means 13. The same results occur if the motor 14" of FIG. 6 is not a motor but a magnetic clutch. The clutch would be utilized to provide a driving connection between the slow traverse motor 14 and a suitable gear transmission, for driving the two input shafts.

Since the schematic construction of FIG. 1 is identical to the specifically illustrated construction of FIG. 2, except for the driving connection between the inclined gear and the output shaft, their operation is identical. When the planetary transmission is used with a machine tool, which is the preferred combination, particularly a lathe, it will first be necessary to bring the tool carriage or work piece carrier rapidly to a processing station, for example. For this purpose, the rapid traverse motor 11 is actuated and the slow traverse motor 14 remains idle. The motor 11, driving chain, and hollow shaft 5 will thus rotate the bevel ring gear 21. The inclined bevel gear 19 will be rotatably driven about its inclined axis through meshing engagement with the gear 21, which rotation of the inclined gear 19 will be transmitted by means of the interengaged bevel gears 22, 24, or alternatively the universal type joint 28 of FIG. 1, to the driven output shaft 23. Therefore, the output shaft 23 will rotate at a high speed to quickly bring the work piece or tool initially to the processing point or station.

An adjustment of the rapid traverse is obtained by additionally rotating the slow traverse motor 14 in the same direction to increase the speed of the output shaft 23 or rotating the slow traverse motor 14 in the reverse direction to correspondingly retard the speed of the output shaft 23. Also, with the infinite adjustability of each of the motors 11, 14, any desired speed may be obtained within a predetermined relatively wide range of speeds. The tool or work carriage may be quickly returned to its starting position by reversing the rapid traverse motor 11.

After the respective tool or work carriage has reached the processing point or station by means of the rapid traverse, a fine or precision advance may be obtained by actuating the slow traverse motor 14 and deactivating the rapid traverse motor 11. By means of the chain drive 13, the motor 14 will drive the input shaft 8 rotatably about its longitudinal axis. With ring gear 21 now relatively stationary, the inclined bevel gear 19 will have a tumbling planetary type motion as it tracks about gear 21 during rotation of input shaft 8. Only because the number of teeth differ between the gears 19 and 21, a rotation will be imparted to the driven shaft 23 through the driving connection of the bevel gears 22, 24 or alternatively the universal joint 28 of FIG. 1. For example, if 120 teeth are provided and there is a one-tooth difference between the engaged gears 19, 21, there will be a speed reduction ratio of 120 to 1 between the input shaft 8 and the output shaft 23. By slowly breaking the rapid traverse motor 11, a slow start may be attained. Also, the break may be so aligned and regulated that it may be pulled, for example by means of an abutment, only up to a specific torque. If this torque is exceeded, the friction break will function as an overload clutch and slip for the protection of the slow traverse mechanism.

Further variations in the rotational output of the transmission may be obtained by varying the speed of the respective motors and the direction of rotation of the respective motors for simultaneous operation. Also, the gear ratio may be further modified with a corresponding modification in the number of teeth between the gears 19 and 21.

When only a single motor is used in combination with a clutch power transmission for driving the two input shafts, the motor will operate at all times. With a clutch and brake combined with a single motor, the clutch will be engaged for the rapid traverse and the brake will be engaged with corresponding disengagement of the clutch for the slow traverse.

Further modifications, variations, and embodiments are contemplated within the spirit and scope of the present invention as defined by the following claims.

I claim:

1. A tumbling gear planetary transmission, comprising: a relatively stationary support; first, second, and third shaft members rotatably mounted about the same axis of rotation and with respect to said support; said first shaft member freely carrying a gear with a fixed number of teeth for free relative rotation thereon with respect to an axis inclined with respect to the axis of said first shaft member; said second shaft member drivingly carrying a second gear having a fixed number of teeth different from the fixed number of teeth of said first gear and in meshing engagement with said first gear, wherein said first and second gears define a relatively small acute angle therebetween; said second shaft member and second gear carried thereon being mounted for rotation about an axis inclined with respect to said first gear axis of rotation; said second shaft member being mounted concentrically within said third shaft member; power means for selectively rotatably driving said first shaft member; power means for selectively rotatably driving said second shaft member; and said third shaft member constituting an output shaft for the transmission.

2. A tumbling gear planetary transmission according to claim 1, wherein said second power means selectively brakes said second shaft member.

3. A tumbling gear planetary transmission according to claim 1, wherein one of said power means is reversible to selectively drive its corresponding member in both rotatable directions.

4. A tumbling gear planetary transmission according to claim 1, wherein one of said power means selectively drives its corresponding member at an infinite number of speeds within a predetermined substantially wide range of speed.

5. A tumbling gear planetary transmission according to claim 1, wherein said relatively fixed support is a housing for the transmission and one of said power means includes a motor fixedly secured to the outside of said housing.

6. A tumbling gear planetary transmission according to claim 1, wherein said relatively stationary support is a housing for the transmission members and one of said power means includes a motor mounted within said housing.

7. A tumbling gear planetary transmission according to claim 1, wherein said stationary support is a housing enclosing said members; each of said power means includes a motor mounted on opposite outside sides of said housing with respect to each other.

8. A tumbling gear planetary transmission according to claim 1, said power means including two motors, respectively, mounted side by side.

9. A tumbling gear planetary transmission according to claim 1, said power means being two motors, respectively, axially aligned in tandem.

10. A tumbling gear planetary transmission according to claim 1, wherein one of said power means includes a single motor; the other of said power means having a magnetic clutch drivingly connected between said motor and the corresponding member.

11. A tumbling gear planetary transmission according to claim 1, wherein said means drivingly connecting said first gear and said third shaft member is a pair of gears intermeshing with each other and drivingly carried by respective ones of said third shaft member and said first gear, with their axes of rotation correspondingly inclined.

12. A tumbling gear planetary transmission according to claim 1, wherein said means drivingly connecting said first gear and said third shaft member is a universal joint.

13. A tumbling gear planetary transmission according to claim 1, wherein said means drivingly connecting said third shaft member and said first gear is a ball and socket joint.

14. A tumbling gear planetary transmission according to claim 1, wherein each of said power means includes a motor and a chain drive drivingly connected between the corresponding motor and member.

15. A tumbling gear planetary transmission according to claim 1, wherein the power means for said second shaft member includes a friction brake having a predetermined slippage torque to slip upon overloading said first shaft member when said third shaft member is drivingly rotated with a substantial torque exteriorly of said transmission.

References Cited
UNITED STATES PATENTS

| | | | |
|---|---|---|---|
| 2,144,110 | 1/1939 | Herrick. | |
| 2,953,944 | 9/1960 | Sundt | 74—750 |
| 3,159,056 | 12/1964 | Blazo | 74—751 |
| 3,161,083 | 12/1964 | Roe | 74—675 |
| 3,387,688 | 6/1968 | Yoshihara | 74—800 |

LEONARD H. GERIN, Primary Examiner

U.S. Cl. X.R.

74—60, 674, 800